(12) United States Patent
Wobben

(10) Patent No.: US 7,084,522 B2
(45) Date of Patent: Aug. 1, 2006

(54) WIND ENERGY UNIT COMPRISING A HOLLOW SHAFT FOR ROTOR HUB AND GENERATOR

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 41 days.

(21) Appl. No.: 10/466,947

(22) PCT Filed: Jan. 15, 2002

(86) PCT No.: PCT/EP02/00307

§ 371 (c)(1),
(2), (4) Date: Jan. 8, 2004

(87) PCT Pub. No.: WO02/057624

PCT Pub. Date: Jul. 25, 2002

(65) Prior Publication Data

US 2004/0108733 A1  Jun. 10, 2004

(30) Foreign Application Priority Data

Jan. 19, 2001  (DE) ................................ 101 02 255

(51) Int. Cl.
*F03D 9/00*  (2006.01)
(52) U.S. Cl. ................................ 290/55; 290/44; 416/4
(58) Field of Classification Search ................. 290/43, 290/44, 54, 55; 416/4, 179; 415/2.1, 4.5
See application file for complete search history.

(56) References Cited

U.S. PATENT DOCUMENTS

| | | | | |
|---|---|---|---|---|
| 4,291,235 A | * | 9/1981 | Bergey et al. ................. | 290/55 |
| 4,495,423 A | * | 1/1985 | Rogers ......................... | 290/44 |
| 4,692,094 A | * | 9/1987 | Kulinyak ...................... | 416/11 |
| 5,876,181 A | * | 3/1999 | Shin ............................ | 415/2.1 |
| 6,278,197 B1 | * | 8/2001 | Appa ........................... | 290/55 |
| 6,327,957 B1 | * | 12/2001 | Carter, Sr. .................... | 91/41 |
| 6,452,287 B1 | * | 9/2002 | Looker ......................... | 290/55 |

FOREIGN PATENT DOCUMENTS

| | | |
|---|---|---|
| AT | 403 189 B | 11/1997 |
| DE | 261 395 A1 | 10/1988 |
| DE | 39 26 803 A1 | 2/1991 |
| DE | 44 02 184 C2 | 8/1995 |
| DE | 44 26 645 A1 | 1/1996 |
| DE | 196 36 591 C2 | 3/1998 |
| EP | 0 037 002 A1 | 10/1981 |
| FR | 2 810 374 | 12/2001 |
| WO | WO 96/30647 | 10/1996 |
| WO | WO 01/98655 A1 | 12/2001 |

* cited by examiner

*Primary Examiner*—Nicholas Ponomarenko
(74) *Attorney, Agent, or Firm*—Seed IP Law Group PLLC

(57) ABSTRACT

In a wind power installation with a (hollow) axis tube member and a hollow shaft mounted thereon for the rotor there is provided only a single bearing which also carries moments, between the axis tube member and the hollow shaft, whereby the parts of the machine which are to be fixed to the machine carrier and thus on the top of the pylon are of a markedly lower weight without the required orientation between the rotating and stationary parts of the electrical generator being adversely affected. In that arrangement the rotating part of the generator is radially aligned substantially with the bearing. The bearing to be used is in particular a twin-row inclined roller bearing with rows of rollers arranged at an angle of about 45° relative to each other.

7 Claims, 2 Drawing Sheets

120
WIND ENERGY UNIT COMPRISING A HOLLOW SHAFT FOR ROTOR HUB AND GENERATOR

BACKGROUND OF THE INVENTION

1. Field of the Invention

The invention concerns a wind power installation comprising a machine carrier which is to be fixed to the top of a pylon and which on the one hand holds the static part of an electrical generator and on the other hand supports the rotating part thereof as well as a hub of a rotor which carries rotor blades, wherein the rotor hub and the rotating part of the generator are fixed to a common hollow shaft which is supported by means of a single bearing which also carries moments on an axis tube member which is mounted to the machine carrier.

2. Description of the Related Art

DD 261 395 A1 discloses a wind power installation in which both the axis tube member and also the hollow shaft comprises two cylindrical portions which are spaced in the axial direction and which are of greatly different diameters and which are respectively connected together by a conical portion. Both cylindrical parts of the axis tube member and the hollow shaft are connected together by a respective rolling bearing, more specifically the cylindrical portion of larger diameter by an inclined roller bearing near the machine carrier and the cylindrical portion of smaller diameter at a considerable spacing therefrom on the other side of the fixing/mounting of the rotor blades on the rotor hub.

A bearing arrangement with a single bearing is known from DE 44 02 184 A1. In that case a single groove-type ball bearing is arranged at the common centre of mass of the rotatable part of the generator and of the rotor. That arrangement admittedly provides that the single bearing does not have to carry any moments and can therefore run with a comparatively low level of wear, but that arrangement suffers from the disadvantage that air gap guidance and control in the generator is not exact and therefore a larger air gap has to be set. That reduces the level of efficiency of the generator.

BRIEF SUMMARY OF THE INVENTION

In the arrangement and configuration of one embodiment, the invention provides that the rotating part of the generator is radially substantially aligned with the bearing. In that way, not only are the axial length of the axis tube member and thus the weight thereof considerably reduced, but in addition the bearing can withstand all moments, even those which fluctuate in their direction, and which occur around axes extending transversely with respect to the axis of the shaft, without the relative position of the generator rotor with respect to the generator stator changing beyond a critical dimension-even in modern installations with a generator diameter of 4000 mm the generator gap may not exceed a width of 3 mm. Moreover, the moment loading on the bearing is reduced by virtue of the radial alignment of the rotating part of the generator with the bearing. In addition, the centrifugal forces which occur upon rotation of the generator rotor can be carried in a particularly problem-free manner by the bearing and operational reliability of the generator is enhanced.

It is admittedly known from AT 403 189 B for the rotor hub of a wind power installation to be fixed to a hollow shaft which is fixed with a single rolling bearing on the machine housing. In that case however the hollow shaft is keyed to a shaft coupled to a generator which is arranged on the opposite side of the pylon and which is therefore axially remote. The problems which exist in the prior art are solved by the present invention and therefore do not occur in that case. A similar consideration applies in regard to earlier but not previously published FR 2 810 374 A1 in which there is provided a generator having radial gaps and the rotating parts of the generator are not aligned in their entirety with the single rolling bearing.

Preferably the bearing is a twin-row inclined roller bearing with rows of rollers which are arranged in mutually angular relationship. In that case it is particularly provided that each row of rollers includes an angle of about 45° with the axis of the axis tube member and the hollow shaft. That provides for an optimum in terms of the bearing carrying moments. The bearing is desirably arranged next to the machine carrier, wherein the axial length of the axis tube member is substantially restricted to the length of the bearing. The size and the weight of the elements of the wind power installation, which are to be mounted at the top of the pylon, are substantially reduced in that way.

BRIEF DESCRIPTION OF THE SEVERAL VIEWS OF THE DRAWINGS

The drawing illustrates the invention in an embodiment thereof. In the drawing.

DETAILED DESCRIPTION OF THE INVENTION

Figure 1:
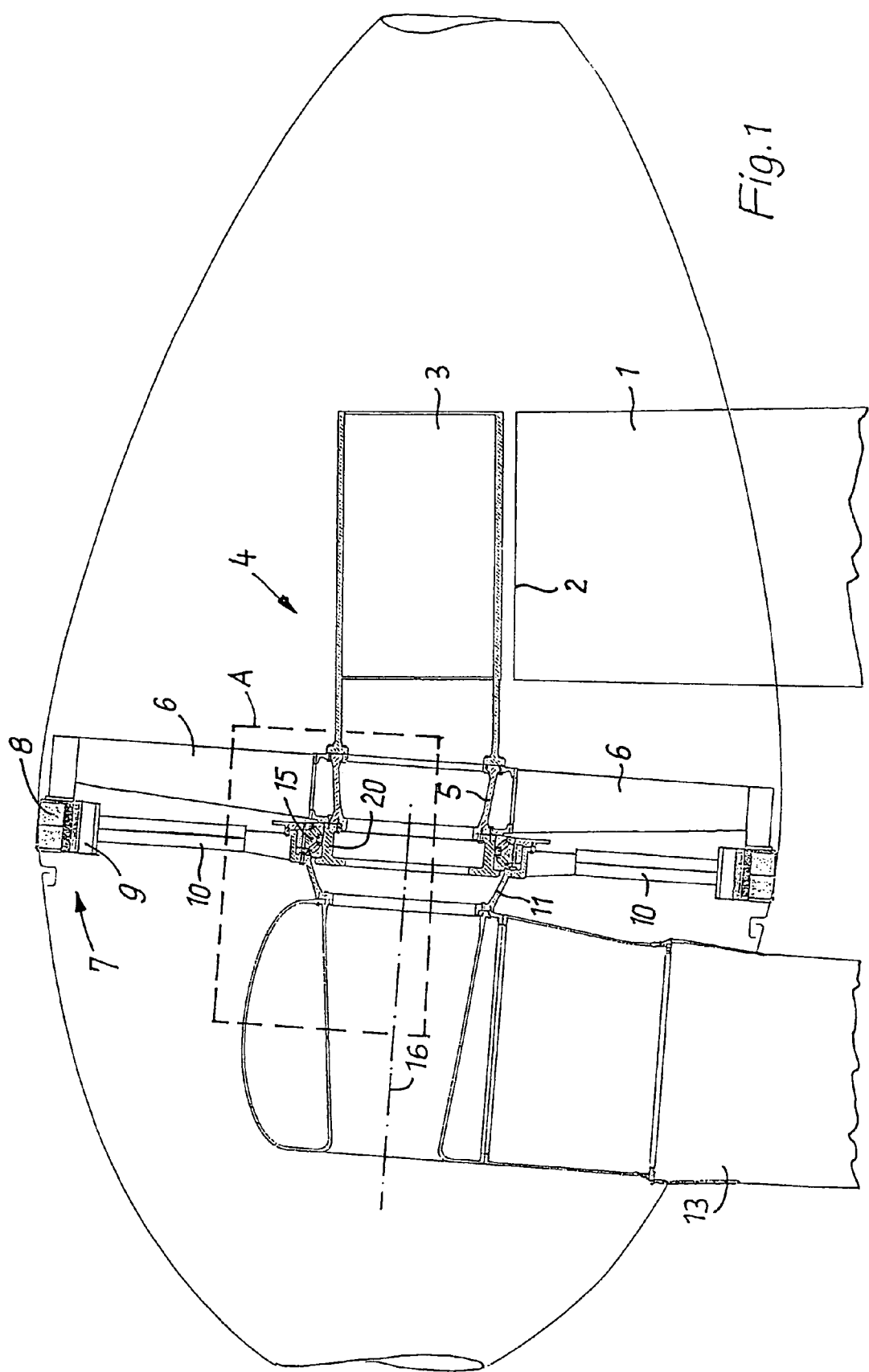
FIG. 1 is a partly diagrammatic view in longitudinal section through a wind power installation at the top of the pylon carrying it.
Figure 2:
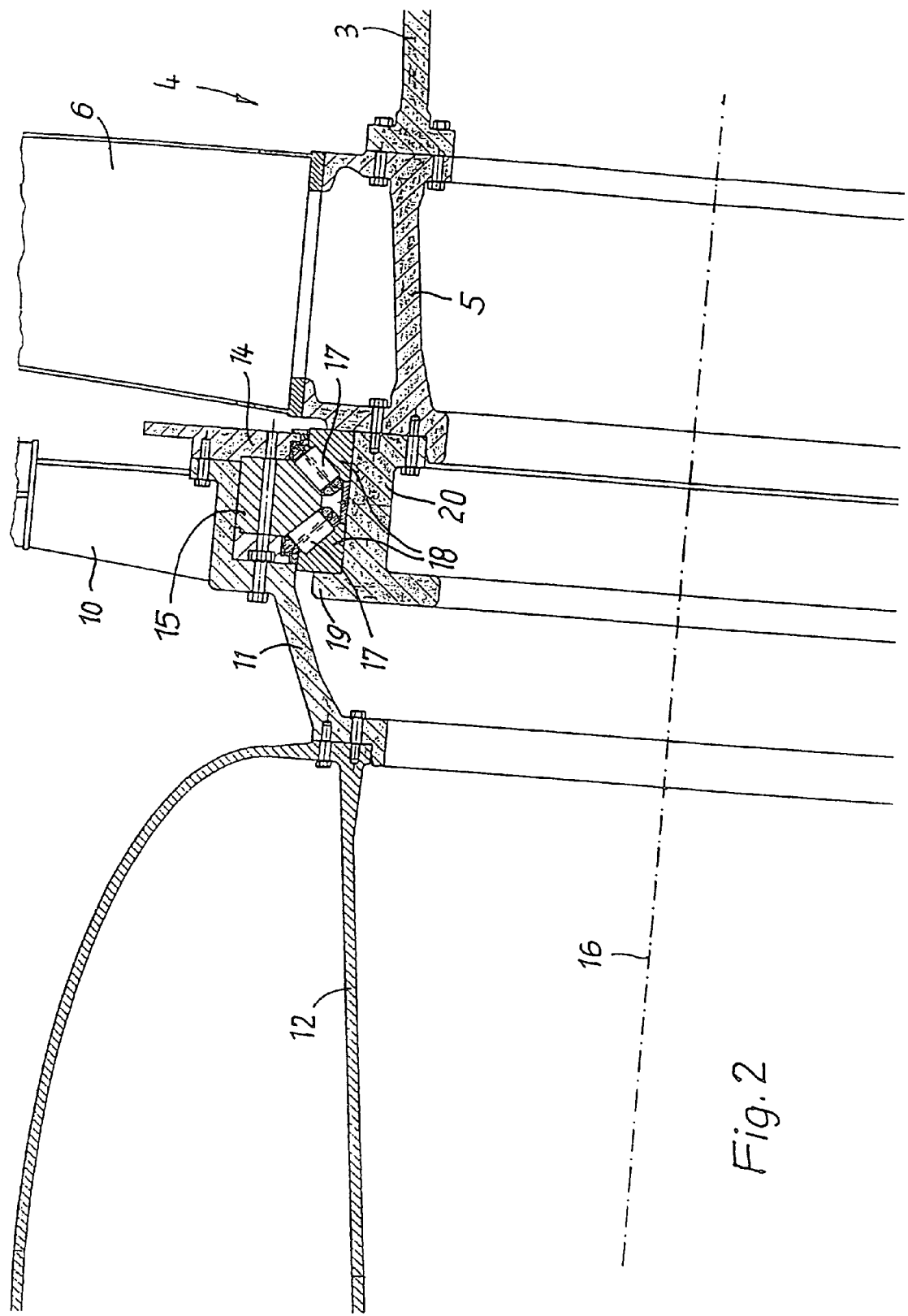
FIG. 2 is an enlarged view of a portion of the bearing in FIG. 1, portion A.

The housing 3 of a machine carrier which is generally identified by reference 4 is fixed at the upper end (top 2) of a pylon 1 in the usual manner. Fixed to the front end of the housing is the central ring 5 of a star-shaped carrier 6 for the stator 8 of an electrical generator which is generally identified by reference numeral 7; its rotor or armature 9 is arranged in concentric relationship therewith with a narrow gap.

The rotor 9 of the generator 7 is held by a carrier 10 which is also substantially star-shaped and which is fixed to a hollow shaft 11 to which the hub 12 of the rotor with the rotor blades 13 is flange-mounted in coaxial relationship.

Jointly with a cover flange 14 the hollow shaft 11—which is of a suitably cranked configuration—encloses the outer race 15 of an inclined roller bearing having two rows of rollers 17 which are arranged inclined at an angle of 45° relative to the axis 16 (and thus at an angle of 90° relative to each other). The inner race of the bearing is formed by the rings 18 which each support a respective row of rollers 17 and which are held by an annular collar 19 of an axis tube member 20 which in turn is flange-mounted to the central ring 5 and thereby fixed to the machine housing 3. The axial length of the axis tube member 20 only slightly exceeds the width of the inclined roller bearing consisting of the races 15, 18 and the rows of rollers 17.

All of the above U.S. patents, U.S. patent application publications, U.S. patent applications, foreign patents, foreign patent applications and nonpatent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation, comprising: a machine carrier which is to be fixed on top of a pylon and which holds a static part of an electrical generator and supports a rotating part of the electrical generator as well as a hub of a rotor carrying rotor blades,
   wherein the rotor hub and the rotating part of the electrical generator are fixed to a common hollow shaft which is supported by a single bearing on an axis tube member which is mounted on the machine carrier,
   wherein the rotating part of the generator is aligned with the single bearing in a direction radial to an axis of the axis tube member, and
   wherein the single bearing is capable of carrying moments induced by the rotor blades on the axis tube member.

2. A wind power installation according to claim 1 wherein the single bearing is arranged next to the machine carrier and an axial length of the axis tube member is restricted to a width of the single bearing.

3. A wind power installation according to claim 1 wherein the bearing is a twin-row inclined roller bearing with rows of rollers, which are arranged in angular relationship.

4. A wind power installation according to claim 3 wherein each row of rollers includes an angle of about 45° with regards to the axis of the axis tube member.

5. A wind power installation, comprising:
   an electrical generator having a static part and a rotating part;
   a machine carrier coupled to the electrical generator to hold the static part of the electrical generator and to support a rotating part of the electrical generator as well as a hub of a rotor carrying rotor blades; and
   a single bearing, wherein the rotor hub and the rotating part of the electrical generator are fixed to a common hollow shaft supported by the single bearing, without use of other supporting bearings, on an axis tube member that is mounted on the machine carrier, wherein the rotating part of the generator is aligned with the single bearing in a direction radial to an axis of the axis tube member, and
   wherein the single bearing is capable of carrying moments induced by the rotor blades on the axis tube member.

6. The wind power installation of claim 5 wherein the single bearing is a twin-row inclined roller bearing with rows of rollers, which are arranged in angular relationship.

7. The wind power installation of claim 6 wherein the angular relationship is about 45° with regards to the axis of the axis tube member.

* * * * *

UNITED STATES PATENT AND TRADEMARK OFFICE
CERTIFICATE OF CORRECTION

PATENT NO. : 7,084,522 B2  Page 1 of 1
APPLICATION NO. : 10/466947
DATED : August 1, 2006
INVENTOR(S) : Alloys Wobben It is certified that error appears in the above-identified patent and that said Letters Patent is hereby corrected as shown below:

Title Page item and Col 1. (Title) should read -

Item (54), Title of the invention "WIND ENERGY UNIT COMPRISING A HOLLOW SHAFT FOR ROTOR HUB AND GENERATOR" should read
-- WIND POWER INSTALLATION HAVING A HOLLOW SHAFT FOR ROTOR HUB AND GENERATOR --.

Item (56), References Cited, "DE261 395" should read -- DD261 395 --.

Signed and Sealed this

Fifth Day of August, 2008

JON W. DUDAS
*Director of the United States Patent and Trademark Office*